United States Patent
Krishnan et al.

(10) Patent No.: US 9,798,966 B2
(45) Date of Patent: Oct. 24, 2017

(54) SYSTEMS AND METHODS OF SMART CARD BASED MOBILE PULL STATIONS

(71) Applicant: Honeywell International Inc., Morristown, NJ (US)

(72) Inventors: Lalu Krishnan, Bangalore (IN); Vipin Das E K, Kannur (IN); Santhosh Achuthan, Palakkad (IN)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/830,196

(22) Filed: Aug. 19, 2015

(65) Prior Publication Data

US 2017/0053523 A1   Feb. 23, 2017

(51) Int. Cl.
| | |
|---|---|
| G08B 27/00 | (2006.01) |
| G06K 19/077 | (2006.01) |
| G08B 25/00 | (2006.01) |
| G08B 25/01 | (2006.01) |
| G08B 17/00 | (2006.01) |
| G08B 25/10 | (2006.01) |

(52) U.S. Cl.
CPC ..... *G06K 19/07713* (2013.01); *G08B 25/009* (2013.01); *G08B 25/016* (2013.01); *G08B 17/00* (2013.01); *G08B 25/10* (2013.01)

(58) Field of Classification Search
CPC ...... G08B 25/016; G08B 25/12; G08B 7/064; G08B 7/06
USPC ........ 340/539.13, 539.11, 573.1, 574, 426.2, 340/573.4, 286.04, 539.18
See application file for complete search history.

(56) References Cited

U.S. PATENT DOCUMENTS

| | | | | |
|---|---|---|---|---|
| 4,332,990 | A * | 6/1982 | Stevens | H01H 9/162 200/314 |
| 4,945,345 | A * | 7/1990 | Proctor | H01H 73/14 335/17 |
| 5,673,304 | A * | 9/1997 | Connor | G08B 25/016 379/38 |
| 5,760,678 | A * | 6/1998 | Pavlacka | G08B 25/12 340/287 |
| 6,084,510 | A * | 7/2000 | Lemelson | G08B 15/004 340/539.13 |
| 6,094,140 | A * | 7/2000 | Parente | G08B 25/016 340/451 |
| 6,226,510 | B1 * | 5/2001 | Boling | G08B 7/064 340/574 |
| 6,310,543 | B1 * | 10/2001 | Yoshioka | G08B 25/016 340/426.2 |

(Continued)

FOREIGN PATENT DOCUMENTS

CA      2 446 295 A1    11/2002

*Primary Examiner* — Hoi Lau
(74) *Attorney, Agent, or Firm* — Husch Blackwell LLP

(57) ABSTRACT

Systems and methods of a smart card based mobile pull station are provided. For example, a smart card can include control circuitry and an activation mechanism. In some methods, the smart card can receive user input to activate the activation mechanism of the smart card, and upon activation of the activation mechanism, the control circuitry of the smart card can transmit an emergency signal. In some methods, a wireless device can receive the emergency signal from the smart card, the wireless device can transmit the emergency signal to a remote device, and the remote device can identify a location of the smart card based on a location of the wireless device.

15 Claims, 6 Drawing Sheets

(56) References Cited

U.S. PATENT DOCUMENTS

| | | | | |
|---|---|---|---|---|
| 6,693,993 B2* | 2/2004 | Toyota | H04M 11/04 | 340/573.1 |
| 6,972,669 B2* | 12/2005 | Saito | B60G 17/0185 | 340/438 |
| 7,151,455 B2* | 12/2006 | Lindsay | G06K 19/0717 | 340/539.26 |
| 7,181,192 B2* | 2/2007 | Panasik | H04M 1/72538 | 340/436 |
| 7,251,471 B2* | 7/2007 | Boling | G08B 15/00 | 340/539.12 |
| 7,315,736 B2* | 1/2008 | Jenkins | G08B 25/016 | 340/539.12 |
| 8,624,727 B2* | 1/2014 | Saigh | H04W 4/025 | 340/539.1 |
| 2001/0026221 A1* | 10/2001 | Toyota | G08B 21/0211 | 340/573.1 |
| 2003/0080870 A1* | 5/2003 | Marmaropoulos | H04B 1/385 | 340/573.1 |
| 2004/0201494 A1* | 10/2004 | Tringali | G08G 1/0965 | 340/902 |
| 2004/0263338 A1* | 12/2004 | Katz | G08B 7/06 | 340/573.4 |
| 2005/0151642 A1* | 7/2005 | Tupler | G08B 25/08 | 340/539.18 |
| 2006/0059963 A1 | 3/2006 | Conforti | | |
| 2006/0152373 A1* | 7/2006 | King | A61B 5/024 | 340/573.1 |
| 2008/0074245 A1* | 3/2008 | Wittorf | G08B 25/016 | 340/426.18 |
| 2008/0102785 A1* | 5/2008 | Childress | G01S 5/0027 | 455/404.1 |
| 2008/0191863 A1* | 8/2008 | Boling | G08B 25/08 | 340/521 |
| 2009/0160643 A1* | 6/2009 | Lizza | G08B 21/0415 | 340/540 |
| 2010/0134277 A1* | 6/2010 | Jang | G08B 7/064 | 340/539.13 |
| 2011/0084837 A1* | 4/2011 | Sher | G06F 21/88 | 340/568.1 |
| 2011/0151768 A1* | 6/2011 | Snider | B60R 25/1025 | 455/1 |
| 2011/0151799 A1* | 6/2011 | Snider | B60R 25/00 | 455/67.13 |
| 2012/0032781 A1* | 2/2012 | Moon | G06F 21/32 | 340/5.82 |
| 2012/0105203 A1* | 5/2012 | Elliot | G08B 25/016 | 340/8.1 |
| 2013/0069766 A1* | 3/2013 | Sorge | G08B 21/04 | 340/6.1 |
| 2013/0162428 A1* | 6/2013 | Baines | B61L 23/06 | 340/539.12 |
| 2014/0118140 A1* | 5/2014 | Amis | G08B 25/08 | 340/539.13 |
| 2014/0145860 A1* | 5/2014 | Park | H04Q 9/00 | 340/870.16 |
| 2014/0167957 A1* | 6/2014 | Tsuji | G08B 21/24 | 340/539.13 |
| 2015/0009011 A1* | 1/2015 | Cahill | H04W 4/22 | 340/7.58 |
| 2015/0238150 A1* | 8/2015 | Subramaniam | H04Q 9/00 | 340/539.11 |
| 2015/0279197 A1* | 10/2015 | Said | G08B 21/02 | 340/573.1 |
| 2015/0348344 A1* | 12/2015 | Rettig | G07C 9/00182 | 340/5.61 |
| 2016/0086481 A1* | 3/2016 | McNutt | G08B 25/12 | 340/540 |
| 2016/0093197 A1* | 3/2016 | See | G08B 25/10 | 340/539.12 |

* cited by examiner

SYSTEMS AND METHODS OF SMART CARD BASED MOBILE PULL STATIONS

FIELD

The present invention relates generally to smart cards. More particularly, the present invention relates to a system and method of a smart card based mobile pull station.

BACKGROUND

There are no known systems and methods for accurately locating a person trapped in a building during a fire incident. Similarly, there are no known systems and methods for notifying authorities about security threats, for example, during a school shooting. Similar location and notification deficiencies arise during medical emergencies and hazard events, such as chemical spills.

In view of the above, there is a continuing, ongoing need for improved systems and methods.

DETAILED DESCRIPTION

Figure 1:
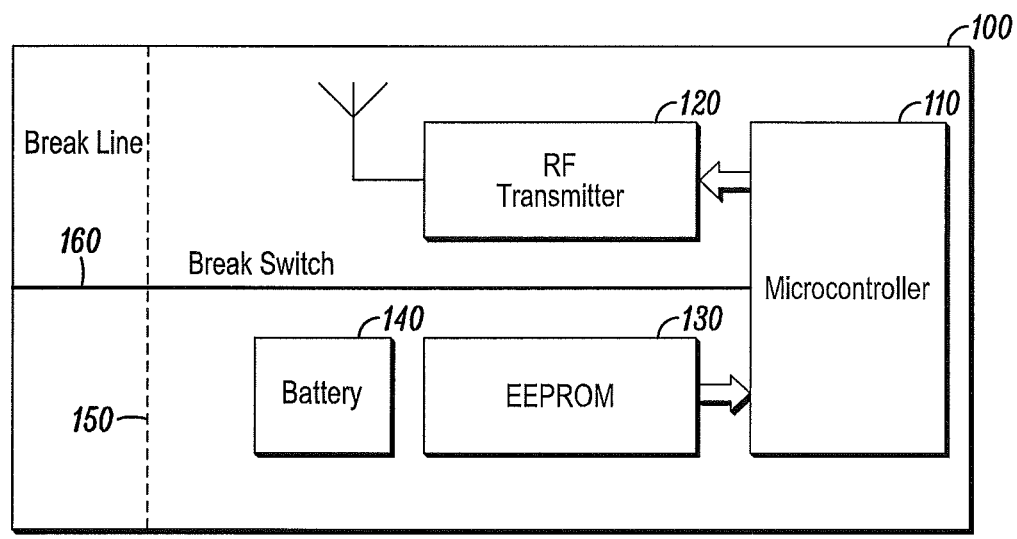
FIG. 1 is block diagram of a smart card based mobile pull station in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of a smart card based mobile pull station. For example, a smart card based mobile pull station can be used in connection with an ambient condition monitoring system installed in a building or region. In some embodiments, a smart card based mobile pull station can be used in connection with a wireless fire system that includes a mesh-based network.

In accordance with disclosed embodiments, a smart card based mobile pull station as disclosed herein can be activated by a user. Upon activation, the smart card based mobile pull station can transmit a wireless signal, for example, an emergency stress signal, and one or more nearby wireless devices can detect the signal and relay the signal, via a system installed in the region, to a gateway or control panel of the system or to a rescue operator's mobile device.

In some embodiments, the systems and methods disclosed herein can include a feedback mechanism to acknowledge the transmission or receipt of the emergency stress signal. For example, in some embodiments, the feedback mechanism acknowledging transmission of the emergency stress signal can include a vibrational notification or a visual notification, such as a blinking LED or a color change on or associated with a smart card. In some embodiments, the feedback mechanism acknowledging receipt of the emergency stress signal can include an alert tone transmitted by a public address system in communication with the mesh-based network. When the appropriate acknowledgement is not received within a predetermined period of time, in some embodiments, a smart card based mobile pull station can boost the power of the transmitted wireless signal so that a wireless detector located further away from the smart card can detect the wireless signal.

In some embodiments, a first responder's mobile device or the like can identify, display, or be informed of the location of the user of the smart card based mobile pull station based on the wireless device that detected the signal of the smart card. Indeed, in some embodiments, the control panel of the system installed in the region can identify the wireless device that originally received the emergency stress signal. Such embodiments can be desired when a user needs fast assistance and/or cannot locate or access a fixed pull station in the region. Accordingly, the user's smart card, when activated, can function as a mobile pull station.

It will be understood that a smart card as disclosed herein can include a smart card, access card, chip card, or integrated circuit card that can be a pocket-sized card with embedded integrated circuits. For example, a smart card as disclosed herein can be integrated with hardware, including, but not limited to a radio, battery, and microprocessor, that is capable of transmitting an RF signal. It will also be understood that a smart card as disclosed herein can made be of plastic, polyvinyl chloride, polyethylene terephthalate based polyester, acrylonitrile butadiene styrene, or polycarbonate. Moreover, it will be understood that a smart card as disclosed herein can provide identification, authentication, data storage, and application processing as would be understood by one of ordinary skill in the art. For example, a smart card as described herein can provide security authentication for single sign-on (SSO) within a large organization.

In some embodiments, a smart card based mobile pull station can transmit signals on a first frequency channel when in normal operation. However, when activated as described above and herein, the smart card based mobile pull station can transmit an emergency stress signal on a second frequency channel that is different from the first frequency channel. In some embodiments, the emergency stress signal can include RF packets, and in some embodiments, the transmitted emergency stress signal can include a unique identifier that indicates that smart card from which the signal originated, thereby identifying the user of the smart card.

As explained above and herein, a user can activate a smart card based mobile pull station. For example, in some embodiments, the user can activate the smart card by breaking the smart card, breaking or pulling a tag associated with the smart card, applying heat above a predetermined temperature to the smart card, breaking a chain or wrist band associated with the smart card, or pressing a panic button associated with the smart card.

The smart card based mobile pull station as disclosed herein can be powered via a battery. In some embodiments, the battery can include a rechargeable battery that can be recharged via wireless charging, vibrational charging, reader point charging, RF energy, or any other energy harvesting method as would be known by one of ordinary skill in the art. In embodiments in which the smart card is powered via an internal battery, the battery can be used only when the smart card is activated, thereby conserving the power and longevity of the smart card.

FIG. 1 is block diagram of a smart card based mobile pull station 100 in accordance with disclosed embodiments. As seen in FIG. 1, the smart card 100 can include a microcontroller 110 in communication with an RF transmitter 120 and a memory device 130, for example, EEPROM. In some embodiments, the smart card 100 can also include a battery 140.

In some embodiments, the smart card can include a break line 150 and a break switch 160. In these embodiments, a user can activate the smart card 100 by breaking the card 100 across the break line 150. Breaking the card 100 across the break line 150 can activate the break switch 160, which can cause the transmitter 120 to transmit a fixed pattern of bit streams as an RF signal. For example, in some embodiments, the fixed pattern can be stored in the memory device 130, and activation of the break switch 160 can cause the microcontroller to retrieve the stored fixed pattern and transmit the retrieved fixed pattern to the transmitter 120 for transmission thereof. In some embodiments, the fixed pattern in the transmitted RF signal can be unique and identify the specific smart card 100 from which it originated.

Although not shown in FIG. 1, a wireless device within a predetermined distance of the smart card 100 can monitor a frequency channel dedicated to emergency stress signals or SOS signals, receive the signal transmitted from the transmitter 120, and transmit the signal with the fixed pattern of bit streams therein to a remote location, such as a control panel or mobile device for further processing. The location of the wireless device that detected the signal from the smart card 100 can be used by the system of which the wireless device is a part, the control panel of the system, or a mobile device that receives the signal to identify the location of the smart card 100 as well as the user carrying the card 100.

Figure 2:
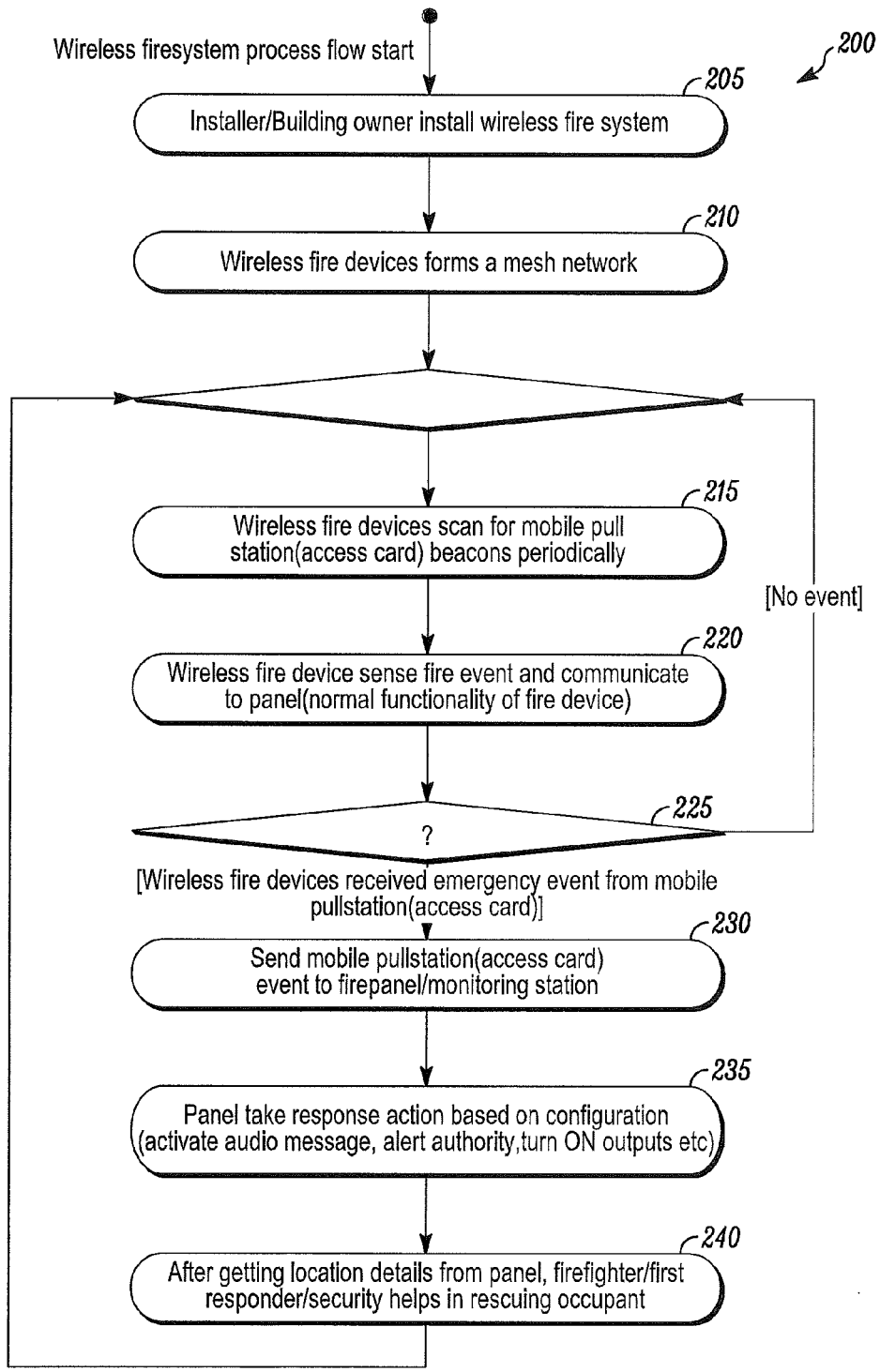
FIG. 2 is a flow diagram of a method in accordance with disclosed embodiments.

FIG. 2 is a flow diagram of a method 200 in accordance with disclosed embodiments. As seen in FIG. 2, the method can include a wireless system, for example, a wireless fire system, being installed in a building as in 205 and wireless devices of the wireless system forming a mesh network as in 210. Then, the method 200 can include the wireless devices periodically scanning for smart cards functioning as a mobile pull station as in 215. For example, a wireless device can scan a frequency channel dedicated to emergency stress signals or SOS signals transmitted from a smart card based mobile pull station.

As seen in FIG. 2, the method 200 can also include the wireless devices detecting fire events and communicating with a control panel of the system as in 220. Such detection and communication can include the normal operation of the wireless devices. However, the method 200 can also determine whether any of the wireless devices received an emergency stress signal or SOS signal from a smart card based mobile pull station as in 225. That is, the method 200 can determine whether any of the wireless devices received a signal from a smart card on the frequency channel dedicated to emergency stress signals or SOS signals. If not, then the method 200 can continue scanning and detecting as in 215 and 220, respectively.

However, when the method 200 determines that a wireless device received an emergency stress signal or SOS signal from a smart card based mobile pull station as in 225, the method can transmit a signal to a control panel, monitoring station, mobile device, or the like indicative of the emergency stress signal or SOS signal event as in 230. Then, the control panel or the like can execute an appropriate action as in 235 responsive to and based on the configuration of the emergency stress signal or SOS signal. For example, the control panel can activate an audio message, alert an appropriate authority, turn on a computer, or the like. In some embodiments, the control panel or the like can identify the type of distress situation that likely caused transmission of the emergency stress signal or SOS signal based on the detection as in 220 or the lack thereof.

In some embodiments, the control panel or the like can identify the location of the smart card based mobile pull station based on the wireless device that received the emergency stress signal or SOS signal. In these embodiments, the control panel or the like can transmit location details of the smart card based mobile pull station to the appropriate authority as in 240, for example, a mobile device of a firefighter, first responder, or security personnel to assist such an authority in rescuing or locating a user of the smart card based mobile pull station.

Figure 3:
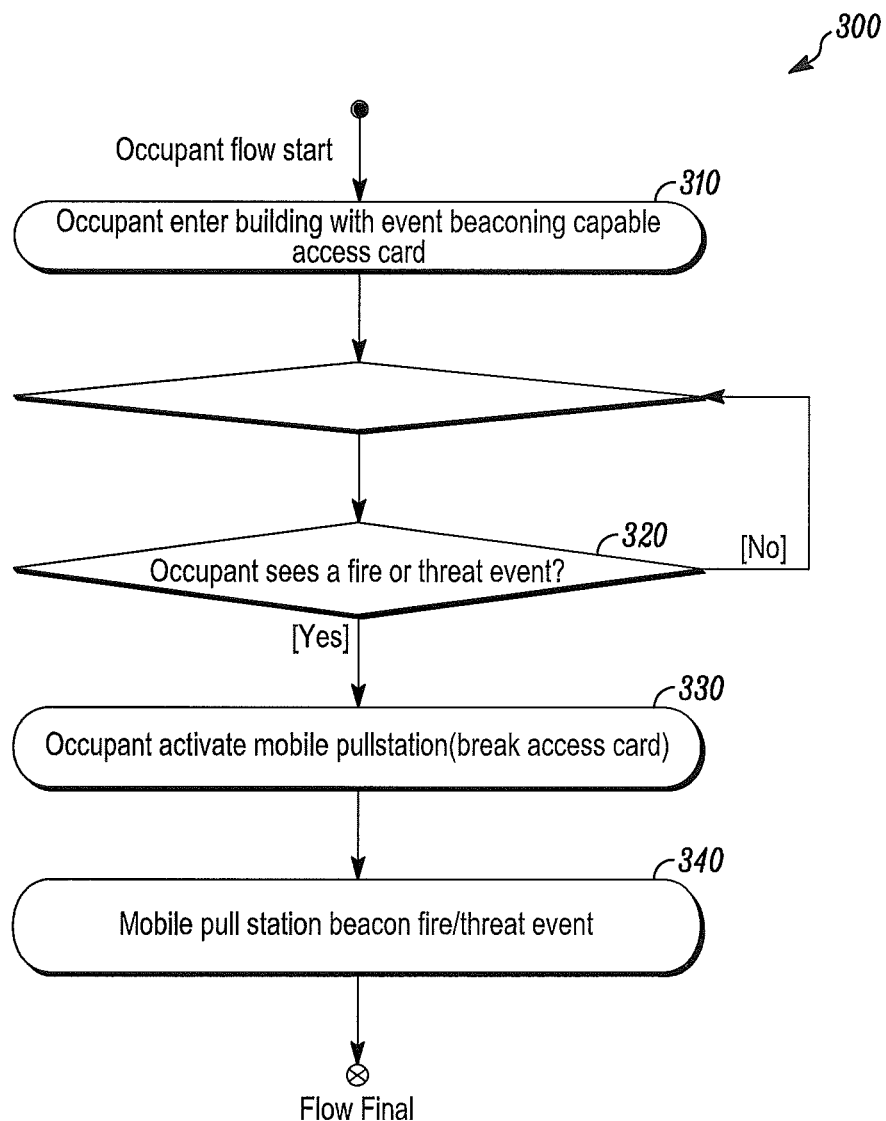
FIG. 3 is a flow diagram of a method in accordance with disclosed embodiments.

FIG. 3 is a flow diagram of a method 300 in accordance with disclosed embodiments. As seen in FIG. 3, the method 300 can include a user entering a region with a smart card capable of transmitting an event beacon signal as in 310. When the user identifies a fire, threat, or other relevant event as in 320, the user can activate the smart card to function as a mobile pull station as in 330. For example, in some embodiments, the user can break the smart card to activate the smart card. Then, the smart card can transmit an appropriate event beacon signal as in 340. In this manner, when activated as a mobile pull station, a smart card in accordance with disclosed embodiments can be a beacon device to identify and publish the location of the smart card.

Figure 4:
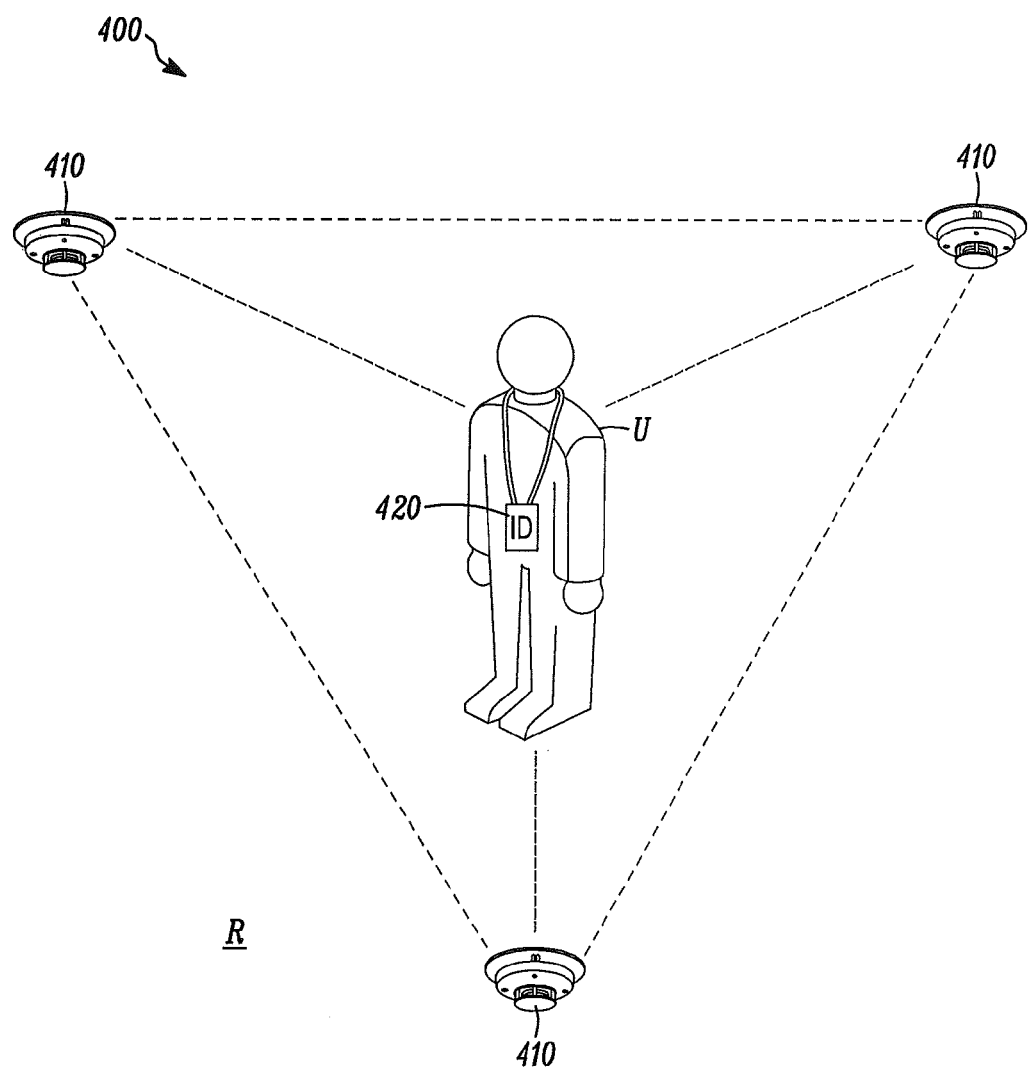
FIG. 4 is a block diagram of a system in accordance with disclosed embodiments.
Figure 5:
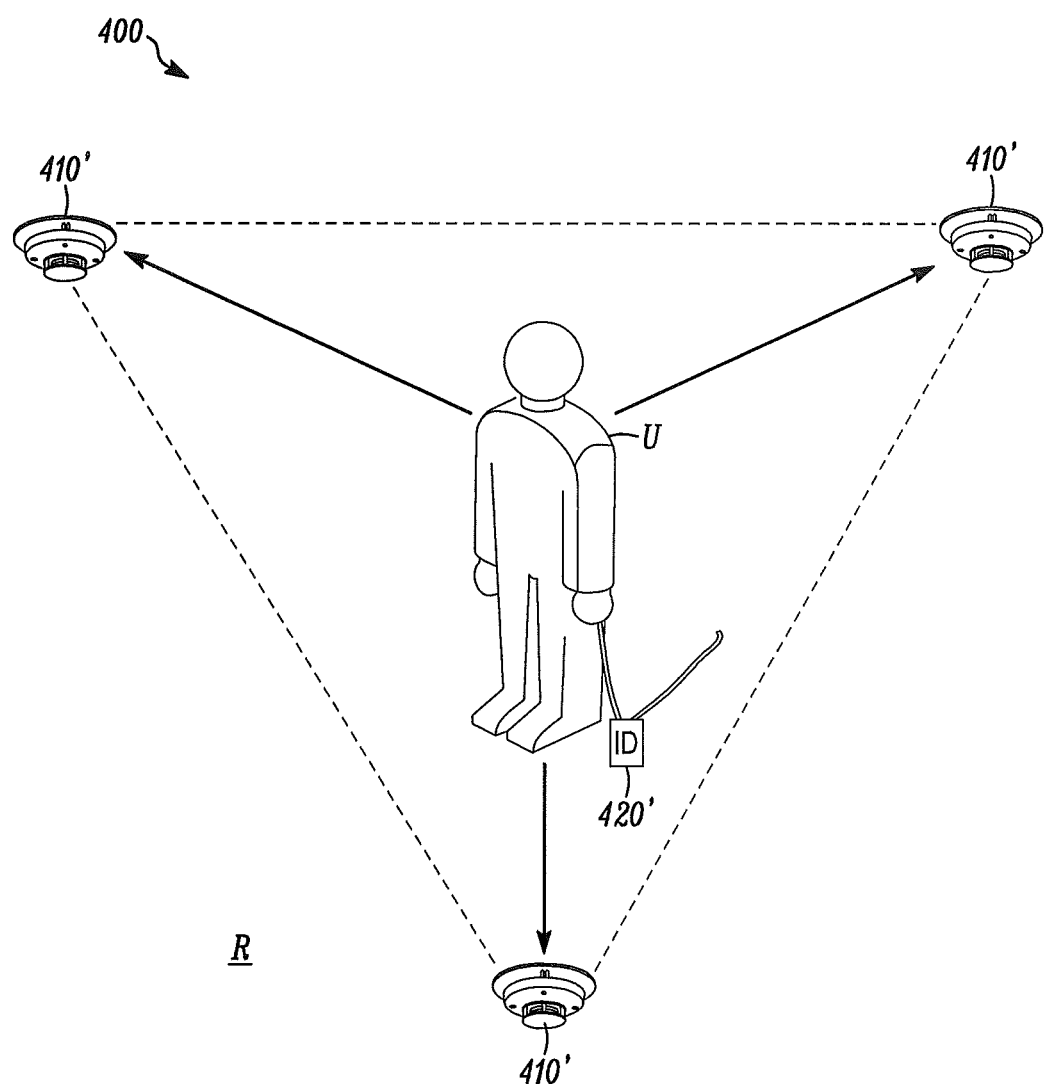
FIG. 5 is a block diagram of a system in accordance with disclosed embodiments.
Figure 6:
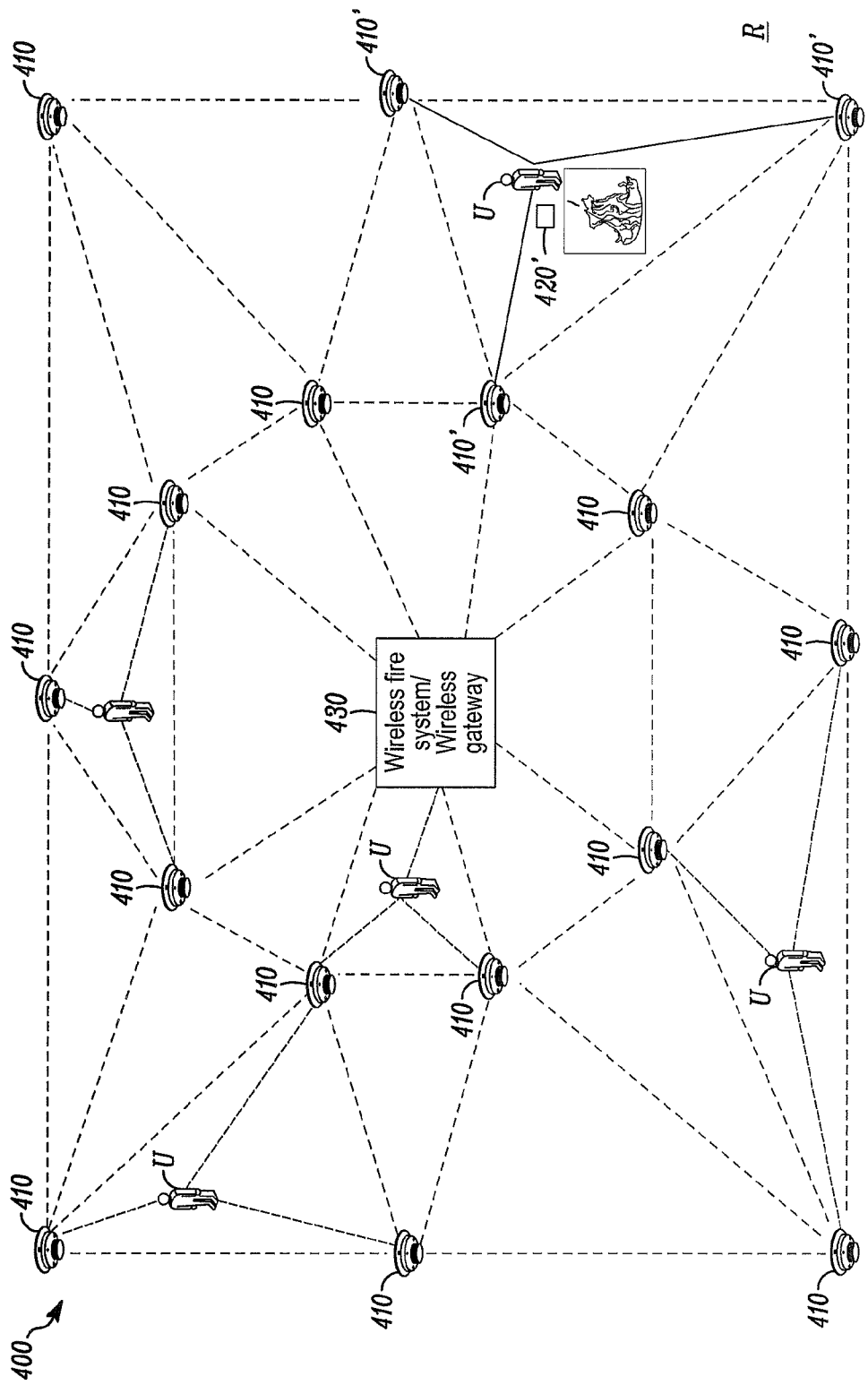
FIG. 6 is a block diagram of a system in accordance with disclosed embodiments.

FIGS. 4-6 are block diagrams of a system 400 in accordance with disclosed embodiments. The system 400 can include a plurality of wireless devices 410 forming a mesh network in a region R, and one or more users U in the region R can have possession of a smart card 420. As seen in FIG. 4, before activation of the smart card 420, the smart card 420 does not communicate with the wireless devices 410 on the frequency channel dedicated to emergency stress signals from smart card based mobile pull stations. However, as seen in FIG. 5, when the user U activates the smart card 420' to function as a mobile pull station, the smart card 420' can communicate with the wireless devices 410' within a predetermined distance from the smart card 420'. Furthermore, as seen in FIG. 6, the wireless devices 410' that receive communication signals from the smart card based mobile pull station 420' can transmit such communication signals to the system control panel, central station, or gateway 430 via the mesh network that includes other wireless devices 410 in the system 400.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A smart card comprising:
control circuitry; and
an activation mechanism,
wherein activation of the activation mechanism causes the control circuitry to transmit an emergency signal,
wherein the control circuitry transmits a normal operation signal on a first frequency channel,
wherein the control circuitry transmits the emergency signal on a second frequency channel,
wherein the activation mechanism includes a break line that, when broken, causes the control circuitry to transmit the emergency signal, and
wherein breaking the break line comprises breaking the smart card across the break line.

2. The smart card as in claim 1 wherein the control circuitry includes a microcontroller, a memory device, and a transmitter, and wherein the activation of the activation mechanism causes the microcontroller to retrieve a unique identifier stored in the memory device and to transmit the unique identifier to the transmitter for transmission thereof in the emergency signal.

3. The smart card as in claim 1 wherein the activation mechanism further includes a break switch that, when activated by breaking the break line, causes the control circuitry to transmit the emergency signal.

4. The smart card as in claim 1 wherein the second frequency channel is dedicated to emergency signals.

5. A method comprising:
receiving user input to activate an activation mechanism of a smart card; and
upon activation of the activation mechanism, control circuitry of the smart card transmitting an emergency signal,
wherein the control circuitry transmits a normal operation signal on a first frequency channel,
wherein the control circuitry transmits the emergency signal on a second frequency channel,
wherein receiving the user input to activate the activation mechanism of the smart card includes receiving the user input to break a break line of the smart card that, when broken, causes the control circuitry to transmit the emergency signal, and
wherein breaking the break line comprises breaking the smart card across the break line.

6. The method of claim 5 wherein the control circuitry of the smart card transmitting the emergency signal includes a microcontroller retrieving a unique identifier stored in a memory device, the microcontroller transmitting the unique identifier to a transmitter, and the transmitter transmitting the unique identifier in the emergency signal.

7. The method of claim 5 wherein receiving the user input to activate the activation mechanism of the smart card further includes receiving the user input to activate a break switch by breaking the break line that, when activated, causes the control circuitry of the smart card to transmit the emergency signal.

8. The method of claim 5 wherein the second frequency channel is dedicated to emergency signals.

9. A method comprising:
a wireless device receiving a normal operation signal from a smart card via a first frequency channel;
the wireless device receiving an emergency signal from the smart card via a second frequency channel in response to a user breaking the smart card across a break line of smart card;
the wireless device transmitting the emergency signal to a remote device; and
the remote device identifying a location of the smart card based on a location of the wireless device.

10. The method of claim 9 wherein the second frequency channel is dedicated to emergency signals.

11. The method of claim 9 wherein the wireless device transmits the emergency signal to the remote device via a mesh network of wireless devices.

12. The method of claim 9 further comprising the wireless device periodically scanning for emergency signals.

13. The method of claim 9 further comprising the wireless device detecting an event in an ambient region, and the wireless device transmitting an event signal indicative of the event to the remote device.

14. The method of claim 13 further comprising the remote device executing a predetermined action based on a configuration of the emergency signal and based on the event in the ambient region.

15. The method of claim 9 further comprising the remote device identifying a unique identifier in the emergency signal, and the remote device identifying the user of the smart card based on the unique identifier.

* * * * *